United States Patent
Yang

(10) Patent No.: US 10,038,384 B2
(45) Date of Patent: Jul. 31, 2018

(54) CONTROL CIRCUIT FOR AN INVERTER WITH SMALL INPUT CAPACITOR

(71) Applicant: SEMICONDUCTOR COMPONENTS INDUSTRIES, LLC, Phoenix, AZ (US)

(72) Inventor: Ta-Yung Yang, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 750 days.

(21) Appl. No.: 13/865,377

(22) Filed: Apr. 18, 2013

(65) Prior Publication Data
US 2013/0279206 A1 Oct. 24, 2013

Related U.S. Application Data

(60) Provisional application No. 61/635,929, filed on Apr. 20, 2012.

(51) Int. Cl.
*H02M 3/335* (2006.01)
*H02M 3/337* (2006.01)

(52) U.S. Cl.
CPC ..... *H02M 3/33515* (2013.01); *H02M 3/3376* (2013.01); *H02M 3/33507* (2013.01)

(58) Field of Classification Search
CPC ........... H02M 3/33515; H02M 3/3376; H02M 3/33507
USPC .... 363/21.02, 21.04, 21.05, 21.06, 49, 56.1, 363/89, 97, 125, 126, 127
See application file for complete search history.

(56) References Cited

U.S. PATENT DOCUMENTS

| | | | | |
|---|---|---|---|---|
| 5,126,642 | A | * | 6/1992 | Shahrodi ............... F04B 49/065 318/268 |
| 5,349,351 | A | * | 9/1994 | Obara ................. H03M 1/1225 318/599 |
| 5,938,947 | A | | 8/1999 | Takano et al. |
| 6,169,670 | B1 | | 1/2001 | Okubo et al. |
| 8,446,129 | B2 | | 5/2013 | Chen et al. |
| 2003/0053323 | A1 | | 3/2003 | Kimura et al. |
| 2005/0111242 | A1 | * | 5/2005 | Oh .................... H02M 3/33507 363/21.07 |

(Continued)

FOREIGN PATENT DOCUMENTS

| | | |
|---|---|---|
| CN | 1476139 A | 2/2004 |
| CN | 1671035 A | 9/2005 |
| CN | 101056084 A | 10/2007 |

(Continued)

*Primary Examiner* — Adolf Berhane
*Assistant Examiner* — Afework Demisse
(74) *Attorney, Agent, or Firm* — Robert F. Hightower

(57) ABSTRACT

A control circuit for an inverter according to the present invention comprises a PWM circuit and a controller. The PWM circuit generates switching signals in accordance with a PWM control signal. The switching signals are coupled to switch a transformer through transistors for generating an output of the inverter. The controller is coupled to receive a command signal and an input signal for generating the PWM control signal. The input signal is correlated to an input voltage waveform of the inverter. The command signal is utilized to determine a power level of the output of the inverter. The advantages of the control circuit are lower cost, small size, good power factor and higher reliability.

20 Claims, 3 Drawing Sheets

(56) References Cited

U.S. PATENT DOCUMENTS

2011/0038180 A1\* 2/2011 Yang .................. H02M 3/3376
363/17
2011/0169418 A1\* 7/2011 Yang .................. H05B 33/0815
315/291

FOREIGN PATENT DOCUMENTS

| | | |
|---|---|---|
| CN | 101064474 A | 10/2007 |
| CN | 101490938 A | 7/2009 |
| CN | 102065616 A | 5/2011 |
| CN | 102148584 A | 8/2011 |
| TW | 201112593 A1 | 4/2011 |
| TW | 201250416 A1 | 12/2012 |
| TW | I399912 B | 6/2013 |
| WO | 2009/120131 A1 | 10/2009 |

\* cited by examiner

CONTROL CIRCUIT FOR AN INVERTER WITH SMALL INPUT CAPACITOR

BACKGROUND OF THE INVENTION

Field of Invention

The present invention relates to a control circuit, and more particularly, the present invention relates to a control circuit for an inverter.

Description of Related Art

Generally, the inverters can be used in the induction heating, the welding machine, etc. The inverter generally has an input capacitor. The input capacitor of the inverter is utilized to store the energy and provide a minimum input voltage to ensure the inverter can operate properly. However, the inverter with a small input capacitor (such as a polyester capacitor) would cause a difficulty for the control.

BRIEF SUMMARY OF THE INVENTION

The object of the present invention is to provide a control method and a control circuit for an inverter with a small input capacitor. The control circuit synchronously generates the output power with the input voltage waveform of the inverter that can solve difficulty for the control. The advantages of the present invention include the lower cost, small size, good power factor and higher reliability.

A control circuit for an inverter according to the present invention comprises a PWM circuit and a controller. The PWM circuit generates switching signals coupled to switch a transformer through transistors for generating an output of the inverter in accordance with a PWM control signal. The controller is coupled to receive a command signal and an input signal for generating the PWM control signal. Wherein the input signal is correlated to an input voltage waveform of the inverter. The command signal is utilized to determine a power level of the output of the inverter.

A control circuit for the inverter according to the present invention comprises a PWM circuit and a microcontroller. The PWM circuit generates switching signals in accordance with a PWM control signal. The switching signals are coupled to switch a transformer through transistors for generating an output of the inverter. The microcontroller is coupled to receive a command signal, an input signal, and a current-sense signal for generating the PWM control signal. The input signal is correlated to an input voltage waveform of the inverter. The current-sense signal is related to a switching current of the transformer. The command signal is utilized to determine a power level of the output of the inverter.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF EMBODIMENTS

Figure 1:
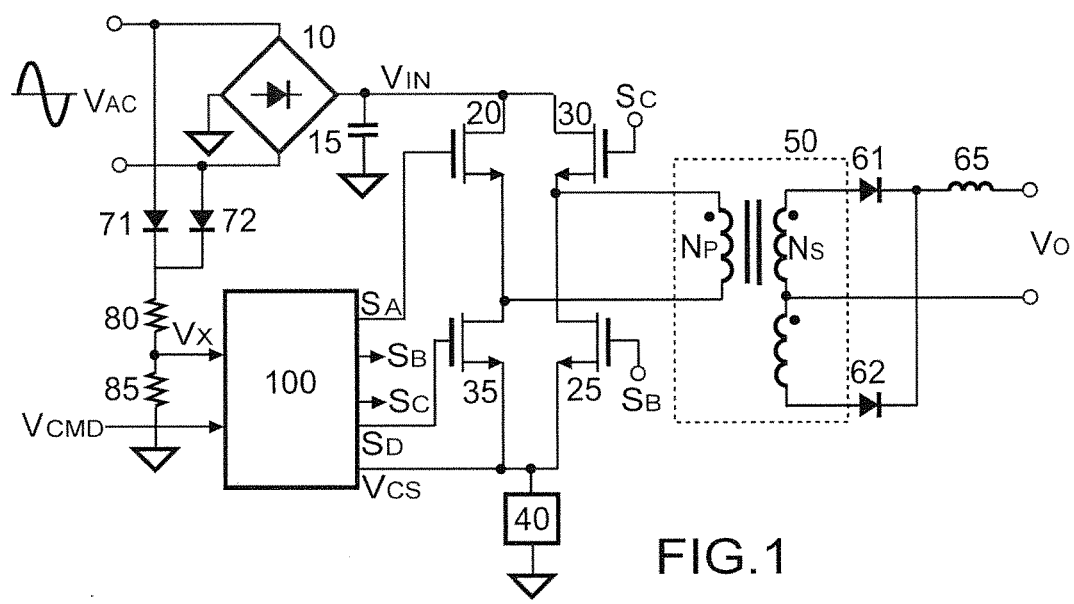
FIG. 1 shows a circuit diagram of an embodiment of an inverter in accordance with the present invention.

FIG. 1 shows a circuit diagram of an embodiment of an inverter in accordance with the present invention. Transistors 20, 25, 30, and 35 are served as switches, and are coupled to switch a primary winding $N_P$ of a transformer 50 for switching and delivering the power from an input voltage $V_{IN}$ of the primary winding $N_P$ to a secondary winding $N_S$ of the transformer 50.

The secondary winding $N_S$ of the transformer 50 generates an output $V_O$ of the inverter through rectifiers 61, 62 and an inductor 65. The rectifier 61 is coupled between a terminal of the secondary winding $N_S$ of the transformer 50 and a first terminal of the inductor 65. A second terminal of the inductor 65 is coupled to an output terminal of the inverter. The rectifier 62 is coupled between the other terminal of the secondary winding $N_S$ of the transformer 50 and the first terminal of the inductor 65.

A first terminal of the primary winding $N_P$ of the transformer 50 is coupled to a source of the transistor 30 and a drain of the transistor 25. A drain of the transistor 30 is coupled to the input voltage $V_{IN}$. A gate of the transistor 30 is coupled to receive a switching signal $S_C$, and the transistor 30 is controlled by the switching signal $S_C$. A source of the transistor 25 is coupled to a terminal of a current-sense device 40. The other terminal of the current-sense device 40 is coupled to the ground. A gate of the transistor 25 is coupled to receive a switching signal $S_B$, and the transistor 25 is controlled by the switching signal $S_B$.

A second terminal of the primary winding $N_P$ of the transformer 50 is coupled to a source of the transistor 20 and a drain of the transistor 35. Drains of the transistors 20 and 30 are coupled to the input voltage $V_{IN}$. A gate of the transistor 20 is coupled to receive a switching signal $S_A$, and the transistor 20 is controlled by the switching signal $S_A$. A source of the transistor 35 is coupled to the current-sense device 40, the source of the transistor 25 and a control circuit 100. A gate of the transistor 35 is coupled to receive a switching signal $S_D$, and the transistor 35 is controlled by the switching signal $S_D$.

The control circuit 100 is coupled to receive an input signal $V_X$ and a command signal $V_{CMD}$ to generate the switching signals $S_A$, $S_B$, $S_C$ and $S_D$ for the control of the transistors 20, 25, 30 and 35, respectively. A switching current flowed through the transformer 50 is used to generate a current-sense signal $V_{CS}$ at the current-sense device 40. The current-sense device 40 can be implemented by a resistor. In other words, the current-sense device 40 senses the switching current of the transformer 50 and generates the current-sense signal $V_{CS}$. Therefore, the current-sense signal $V_{CS}$ is related to the switching current of the transformer 50. The current-sense signal $V_{CS}$ is further coupled to the control circuit 100 for the generation of the switching signals $S_A$, $S_B$, $S_C$ and $S_D$. The current-sense signal $V_{CS}$ is used to limit the value of the switching current of the transformer 50.

The input voltage $V_{IN}$ is produced from an AC input voltage $V_{AC}$ via a bridge-rectifier 10. The bridge-rectifier 10 rectifies the AC input voltage $V_{AC}$ to produce the input voltage $V_{IN}$. A small capacitor 15, such as the polyester capacitor, is coupled between an output terminal of the bridge-rectifier 10 and the ground. The small capacitor 15 is further coupled to the drain of the transistor 20. The small capacitor 15 is utilized to reduce the noise and EMI at an output of the bridge-rectifier 10. Diodes 71, 72 and resistors 80, 85 are coupled to the AC input voltage $V_{AC}$ to generate the input signal $V_X$. The input signal $V_X$ is thus correlated to the levels of the input voltage $V_{IN}$ and the AC input voltage $V_{AC}$. The input signal $V_X$ is further correlated to the waveform of the AC input voltage $V_{AC}$. The command signal $V_{CMD}$ is utilized to determine the power level that delivers to the output $V_O$ of the inverter. The power level of the output $V_O$ of the inverter will become higher when the amplitude of the command signal $V_{CMD}$ is high.

Anodes of the diodes 71 and 72 are coupled to the AC input voltage $V_{AC}$. Cathodes of the diodes 71 and 72 are coupled together. The Diodes 71 and 72 are served as a full-wave rectifier. The resistors 80 and 85 develop a divider. A terminal of the resistor 80 is coupled to the cathodes of the diodes 71 and 72. The resistor 85 is coupled between the other terminal of the resistor 80 and the ground.

Figure 2A:
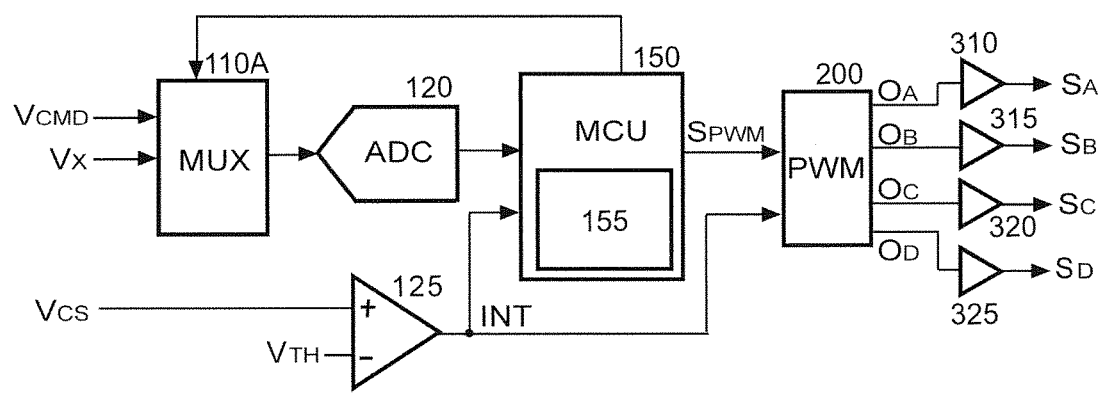
FIG. 2A shows a circuit diagram of an embodiment of a control circuit of the inverter in accordance with the present invention.

FIG. 2A shows a circuit diagram of an embodiment of the control circuit 100 of the inverter in accordance with the present invention. The control circuit 100 has a multiplexer (MUX) 110A, an analog-to-digital converter (ADC) 120, a controller (MCU) 150, and a PWM (pulse width modulation) circuit (PWM) 200. The controller 150 can be a microcontroller for executing at least one instruction code. The controller 150 further includes a memory 155 for storing the instruction code. The memory 155 is flash memory, ROM, PROM, EPROM, EEPROM memory, or other type memory.

The command signal $V_{CMD}$ and the input signal $V_X$ are coupled to an input terminal of the analog-to-digital converter 120 through the multiplexer 110A. The multiplexer 110A of the control circuit 100 receives analog input signals that include the command signal $V_{CMD}$ and the input signal $V_X$. The multiplexer 110A further selects at least one of the analog input signals and sequentially outputs the selected analog input signal to the input terminal of the analog-to-digital converter 120. The channel selection of the multiplexer 110A is set by the controller 150 for selecting the command signal $V_{CMD}$ or the input signal $V_X$. The analog-to-digital converter 120 will convert the analog input signal (the command signal $V_{CMD}$ and the input signal $V_X$) to digital signal and send the digital signal to the controller 150.

In accordance with the command signal $V_{CMD}$ and the input signal $V_X$ received by the controller 150, the controller 150 will execute the instruction code to perform the digital signal process and generate a PWM control signal $S_{PWM}$, it can be expressed as, $$S_{PWM} = K_{eqz} \times V_{CMD} \times V_X \qquad (1)$$

$$V_O = K_{pwm} \times S_{PWM} \qquad (2)$$

where $K_{eqz}$ and $K_{pwm}$ are the constant. The $K_{eqz}$ and $K_{pwm}$ can be stored in the memory 155. Upon the equation (1), the PWM control signal $S_{PWM}$ is obtained. In other words, the PWM control signal $S_{PWM}$ is generated in accordance with a result that is related to the input signal $V_X$ times the command signal $V_{CMD}$.

The PWM control signal $S_{PWM}$ is coupled to the PWM circuit 200 to generate signals $O_A$, $O_B$, $O_C$, and $O_D$. The pulse width of each of the signals $O_A$, $O_B$, $O_C$, and $O_D$ is determined by the value of the PWM control signal $S_{PWM}$. The signals $O_A$, $O_B$, $O_C$, and $O_D$ are further coupled to generate the switching signals $S_A$, $S_B$, $S_C$, and $S_D$ through output buffers 310, 315, 320, and 325 that are able to increase driving capacity. The wider pulse width of the switching signals $S_A$, $S_B$, $S_C$, and $S_D$ will generate the higher output $V_O$. According to above, the PWM circuit 200 generates the switching signals $S_A$, $S_B$, $S_C$, and $S_D$ to switch the transformer 50 (as shown in FIG. 1) through the transistors 20, 25, 30, and 35 for generating the output $V_O$ of the inverter in accordance with the PWM control signal $S_{PWM}$.

The current-sense signal $V_{CS}$ is coupled to a positive input terminal of a comparator 125. A negative input terminal of the comparator 125 is coupled to receive a threshold $V_{TH}$. The comparator 125 compares the current-sense signal $V_{CS}$ with the threshold $V_{TH}$. The comparator 125 will generate an interrupt signal INT when the value of the current-sense signal $V_{CS}$ is higher than the threshold $V_{TH}$. This interrupt signal INT will interrupt the controller 150 and control the PWM circuit 200 to directly turn off the signals $O_A$, $O_B$, $O_C$, and $O_D$ for protecting the transistors 20, 25, 30, 35 (as shown in FIG. 1) and the inverter. In other words, the interrupt signal INT directly turns off the switching signals $S_A$, $S_B$, $S_C$, and $S_D$ for protecting the transistors 20, 25, 30, 35 and the inverter.

Figure 2B:
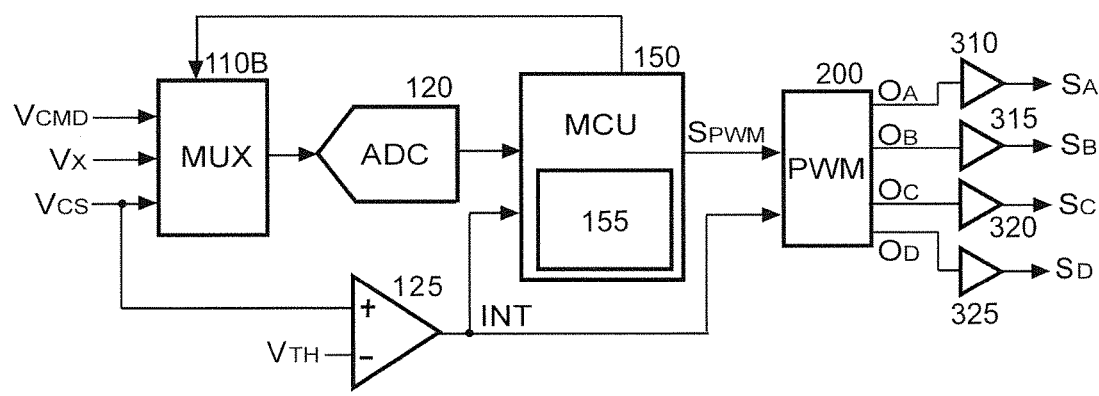
FIG. 2B shows a circuit diagram of another embodiment of the control circuit of the inverter in accordance with the present invention.

FIG. 2B shows a circuit diagram of another embodiment of the control circuit 100 of the inverter in accordance with the present invention. The multiplexer 110B of the control circuit 100 further receives the current-sense signal $V_{CS}$. Therefore, the current-sense signal $V_{CS}$ is coupled to the input terminal of the analog-to-digital converter 120 through the multiplexer 110B. The current-sense signal $V_{CS}$ is also the analog input signal. The multiplexer 110B further selects the command signal $V_{CMD}$, the input signal $V_X$, or the current-sense signal $V_{CS}$ and sequentially outputs the selected signal to the input terminal of the analog-to-digital converter 120. The analog-to-digital converter 120 will convert the command signal $V_{CMD}$, the input signal $V_X$ and the current-sense signal $V_{CS}$ to the digital signal and send the digital signal to the controller 150.

In accordance with the command signal $V_{CMD}$, the input signal $V_X$, and the current-sense signal $V_{CS}$, the controller 150 will perform another digital signal process for generating the PWM control signal $S_{PWM}$, it can be expressed as, $$S_{OFFSET} = G \times [(K_0 \times V_{CMD} \times V_X) - V_{CS}] \qquad (3)$$

$$S_{PWM} = K_1 \times S_{OFFSET} \qquad (4)$$

$$V_O = K_{pwm} \times S_{PWM} \qquad (5)$$

where the G is the gain of the control, $K_0$ and $K_1$ are the constant. The $K_0$ and $K_1$ can be stored in the memory 155.

An error signal represents the error between the command signal $V_{CMD}$ (the scaled command signal $V_{CMD}$), the input signal $V_X$, and the current-sense signal $V_{CS}$. Upon the equation (3), the error signal is related to that a waveform signal ($K_0 \times V_{CMD} \times V_X$) minus the current-sense signal $V_{CS}$, the waveform signal is related to that the input signal $V_X$ times the command signal $V_{CMD}$. This error signal is amplified by the gain G for generating an offset signal $S_{OFFSET}$. This offset signal $S_{OFFSET}$ is further coupled to generate the PWM control signal $S_{PWM}$ for producing the output $V_O$. Therefore, the PWM control signal $S_{PWM}$ is generated in accordance with the error signal.

Figure 3:
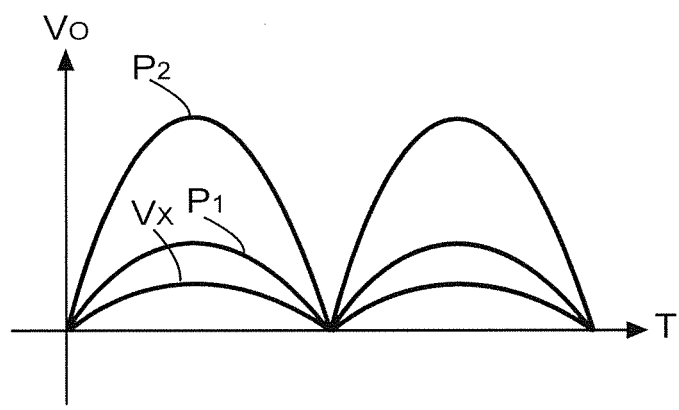
FIG. 3 shows the waveforms of an input signal $V_X$ and a power ($P_1$, $P_2$) of an output $V_O$ of the inverter.

FIG. 3 shows the waveforms of the input signal $V_X$ and the power ($P_1$, $P_2$) of the output $V_O$ of the inverter. A waveform $P_1$ shows a lower power output that the power of the output $V_O$ is lower. Another waveform $P_2$ shows a higher power output that the power of the output $V_O$ is higher, in which the power ($P_1$ or $P_2$) of the output $V_O$ is programmed by the command signal $V_{CMD}$, and the command signal $V_{CMD}$ is programmable. Further, the power ($P_1$ or $P_2$) of the output $V_O$ is correlated to the input signal $V_X$. Because the power of the output $V_O$ follows the waveform of the input signal $V_X$, and the input signal $V_X$ is correlated to the waveform of the AC input voltage $V_{AC}$ (as shown in FIG. 1) of the inverter, the input of the inverter can achieve a good power factor (PF).

Figure 4:
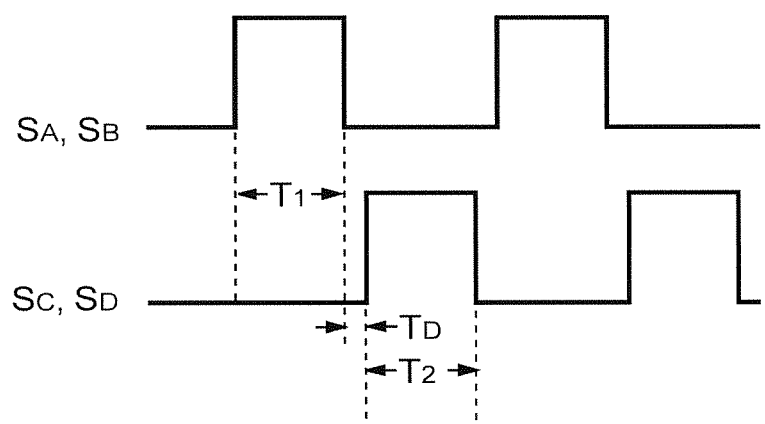
FIG. 4 shows the waveforms of the switching signals $S_A$, $S_B$, $S_C$, and $S_D$.

FIG. 4 shows the waveforms of the switching signals $S_A$, $S_B$, $S_C$, and $S_D$. The on time (pulse width) $T_1$ and $T_2$ are determined by the values of the PWM control signal $S_{PWM}$. A dead time $T_D$ is inserted between the on time of the switching signals $S_A$, $S_B$ and the on time of the switching signals $S_C$, $S_D$. The dead time $T_D$ will prevent the transistors 20, 35 and 30, 25 (as shown in FIG. 1) from cross conduction.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of an inverter, comprising:
    a PWM circuit for generating switching signals to control transistors to switch a transformer in accordance with a PWM control signal for generating an output of the inverter; and
    a controller coupled to receive a command signal and an input signal for outputting the PWM control signal to the PWM circuit wherein the input signal and the output have a cyclically varying waveform that is correlated to a substantially sine wave waveform of an a.c. input voltage waveform, and wherein the command signal is utilized to determine a power level of the sine wave output of the inverter.

2. The circuit as claimed in claim 1, wherein the controller further comprises:
    a memory storing at least one instruction code for executing the instruction code to generate the PWM control signal;
    wherein a phase of the cyclically varying waveform of the output of the inverter is the same as a phase of the input signal.

3. The circuit as claimed in claim 1, further comprising a current-sense device coupled to sense a switching current of the transformer and generate a current-sense signal coupled to limit the value of the switching current of the transformer; and a phase angle of the cyclically varying waveform of the output of the inverter is the same as a phase angle of the input signal.

4. The circuit as claimed in claim 1, further comprising a comparator coupled to receive a current-sense signal for generating an interrupt signal in response to the current-sense signal being over a threshold; wherein the interrupt signal is coupled to interrupt the controller and directly turn off the switching signals, the current-sense signal is related to a switching current of the transformer.

5. The circuit as claimed in claim 1, wherein the PWM control signal is generated in accordance with a result that is related to the input signal times the command signal.

6. The circuit as claimed in claim 1, further comprising an analog-to-digital converter converting the command signal or/and the input signal to a digital signal, and sending the digital signal to the controller.

7. The circuit as claimed in claim 6, further comprising a multiplexer for selecting the command signal and the input signal, and for sequentially outputting the command signal and the input signal to the analog-to-digital converter.

8. The control circuit of claim 1 wherein the PWM control circuit is configured to generate the switching signals to control two or more transistors.

9. A control circuit of an inverter, comprising:
    a PWM circuit for generating switching signals to control transistors to switch a transformer in accordance with a PWM control signal for generating an output of the inverter; and
    a microcontroller coupled to receive a command signal, an input signal, and a current-sense signal for outputting the PWM control signal to the PWM circuit;
    wherein the input signal and the output have a waveform that is correlated to a substantially sine wave waveform of an input voltage of the inverter; the current-sense signal is related to a switching current of the transformer, and the command signal is utilized to determine a power level of the sine wave output of the inverter.

10. The circuit as claimed in claim 9, wherein the microcontroller further comprises:
    a memory storing at least one instruction code for executing the instruction code to generate the PWM control signal;
    wherein a phase of the sine wave output of the inverter is the same as a phase of the input signal.

11. The circuit as claimed in claim 9, further comprising a comparator coupled to receive the current-sense signal for generating an interrupt signal in response to the current-sense signal being over a threshold; wherein the interrupt signal is coupled to interrupt the microcontroller and directly turn off the switching signals; a phase angle of the sine wave output of the inverter is the same as a phase angle of the input signal.

12. The circuit as claimed in claim 9, wherein the PWM control signal is generated in accordance with an error signal; the error signal is related to a waveform signal minus the current-sense signal; the waveform signal is related to the input signal times the command signal.

13. The circuit as claimed in claim 9, further comprising an analog-to-digital converter for converting the command signal, the input signal, or/and the current-sense signal to a digital signal, and sending the digital signal to the microcontroller.

14. The circuit as claimed in claim 13, further comprising a multiplexer selecting the command signal, the input signal, and the current-sense signal, and configured to sequentially output the command signal, the input signal, and the current-sense signal to the analog-to-digital converter.

15. A control circuit of an inverter, comprising:
    a PWM circuit for generating at least one switching signal to control at least one transistor to switch a transformer in accordance with a PWM control signal for generating an output of the inverter; and
    a controller coupled to receive a command signal and an input signal for outputting the PWM control signal to the PWM circuit wherein the input signal has a waveform that is correlated to an a.c. input voltage waveform of the inverter and a waveform of the output is correlated to the waveform of the input signal and wherein the command signal is utilized to determine a power level of the sine wave output of the inverter.

16. The circuit as claimed in claim 15, wherein the controller further comprises:
a memory storing at least one instruction code for executing the instruction code to generate the PWM control signal;
wherein a phase of the output of the inverter is the same as a phase of the input signal.

17. The circuit as claimed in claim 15, further comprising a current-sense device coupled to sense a switching current of the transformer and generate a current-sense signal coupled to limit the value of the switching current of the transformer; a phase angle of the sine wave output of the inverter is the same as a phase angle of the input signal.

18. The circuit as claimed in claim 15, wherein the controller further receives a current-sense signal for generating the PWM control signal, and the current-sense signal is related to a switching current of the transformer.

19. The circuit as claimed in claim 15, further comprising a comparator coupled to receive a current-sense signal for generating an interrupt signal in response to the current-sense signal being over a threshold; wherein the interrupt signal is coupled to interrupt the controller and directly turn off the switching signals, the current-sense signal is related to a switching current of the transformer.

20. The circuit as claimed in claim 15, wherein the PWM control signal is generated in accordance with a result that is related to the input signal times the command signal.

* * * * *